United States Patent [19]
Zhang et al.

[11] Patent Number: 6,069,861
[45] Date of Patent: May 30, 2000

[54] HIGH DENSITY DATA STORAGE SYSTEM WITH SPECIFICALLY SHAPED OPTICAL FIBER AS OPTICAL READ/WRITE HEAD

[75] Inventors: Kai Zhang, San Jose; Peter C. Chang, Mountain View, both of Calif.

[73] Assignee: Alliance Fiber Optics Products, Inc., Sunnyvale, Calif.

[21] Appl. No.: 08/985,789

[22] Filed: Dec. 5, 1997

[51] Int. Cl.[7] ........................................ G11B 7/00
[52] U.S. Cl. ............................................... 369/112
[58] Field of Search .......................... 369/13, 112, 126, 369/100, 110, 14; 360/114

[56] References Cited

U.S. PATENT DOCUMENTS 5,689,480  11/1997  Kino ........................................ 369/112

*Primary Examiner*—Thang V. Tran

[57] ABSTRACT

An optics of a read/write system includes a stationary optical device for condensing a light beam and leading said light beam into an optical fiber. A distal end of the optical fiber is moveable and with a tapered configuration thereof for focusing the light emerging from the optical fiber into a beam spot on an optical recording medium. A detector detects through the optical fiber light reflected back from the recording medium.

1 Claim, 6 Drawing Sheets

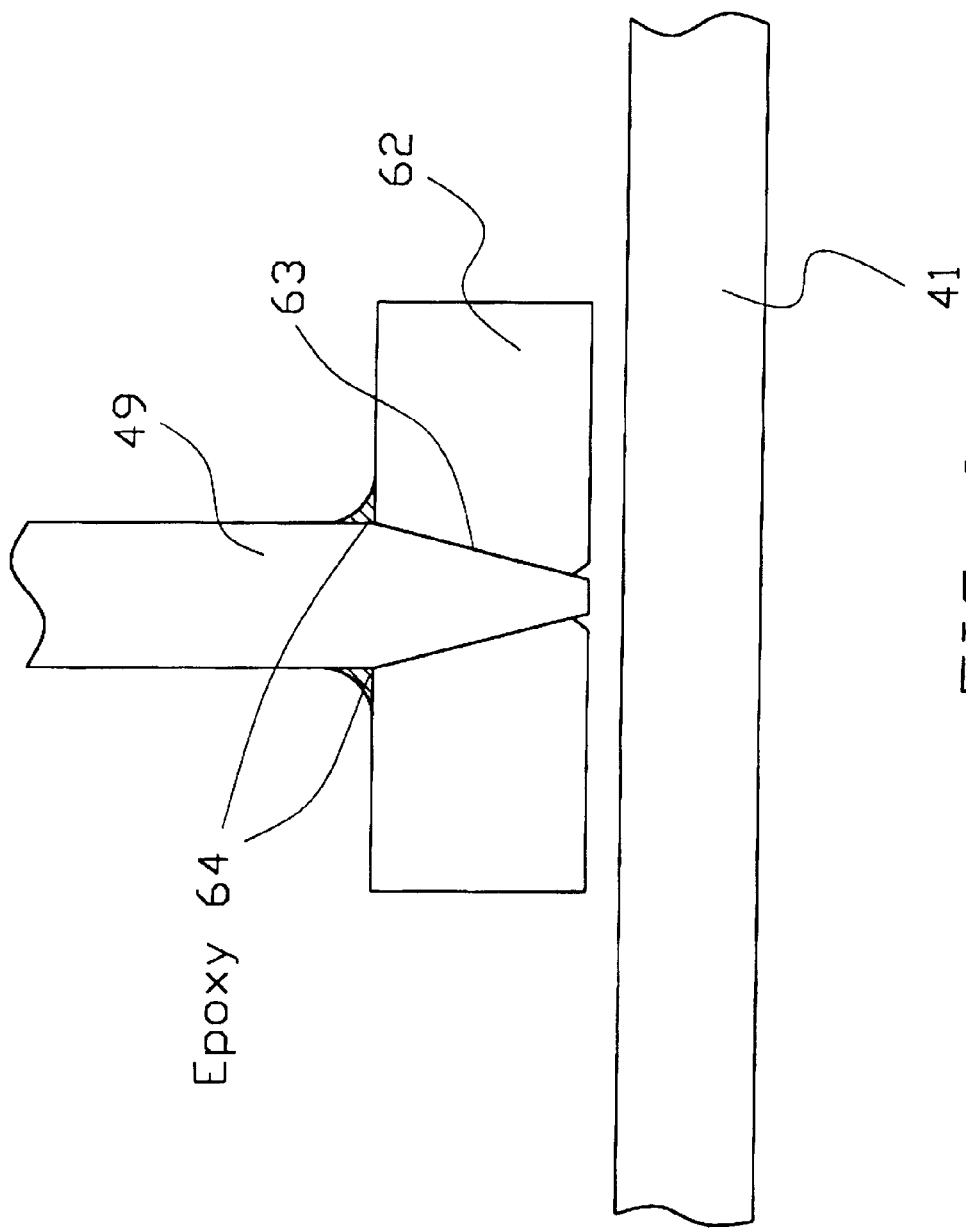

HIGH DENSITY DATA STORAGE SYSTEM WITH SPECIFICALLY SHAPED OPTICAL FIBER AS OPTICAL READ/WRITE HEAD

BACKGROUND OF THE INVENTION

The present invention relates to a high density data storage system with tapered optical fiber as optical read/write head, and more particularly, to the optics and structure of an optical head apparatus for high data storage density recording.

Optical disks have recording densities higher by about one order of magnitude than magnetic disks and other like memory devices. Optical disks are expected to play a major role from now on as a large capacity storage memory addressing multimedia applications.

In optical recording, a light beam is used as a multipurpose tool for both marking to and reading information from a recording media. In optical recording, an optical stylus provides a tightly focused spot of light to the recording media. The light is used to read or form marks on the surface of the recording medium. Optical read/write head designs are well described in the book entitled, "The Physical Principles of Magneto-optical Recording" authored by Masud Mansuripur, Cambridge University Press, 1995.

In the field of laser technology, improvements have been made to use laser sources of progressively shorter wavelengths. The trend toward shorter wavelengths is to make recording densities higher than ever before. Aside from the attempts to enhance the recording density of optical disks using laser sources of shorter wavelengths, some engineers are trying to increase the numerical aperture (NA) of objective lenses. The spot size d of a light beam emitted by a laser source on an optical disk surface is given by dividing the wavelength of the beam, $\lambda$, by the numerical aperture of the objective lens in use, $$d \sim \lambda/NA.$$

This is because the recording density is inversely proportional to the squared reciprocal number of the spot size involved. According to the above formula, we also see the reason why shorter wavelengths are used to reduce the spot size.

As understood, anyhow it is difficult and not economic to make the lens with its NA>1, so the diffraction limit, which is the smallest spot size of light, is almost the $\lambda$. Therefore, in the so-called far field arrangement, NA~1, and d~$\lambda$~1 $\mu$m.

Therefore, from one viewpoint, the larger numerical aperture (NA) is desired to obtain the smaller the spot size, while from another viewpoint, even though generally which is smaller than 1, of the objective lens entails some disadvantages. According to classical diffraction theory, $$\delta \sim \lambda/(NA)^2$$

wherein the depth of focus of a lens, $\delta$, is the distance away from the focal plane over which tight focus can be maintained. As the disk spins under the optical head at the rate of several thousand rpm, the objective lens must stay within a distance of f(focal length) $\pm\lambda/2$ from the active layer if proper focus is to be maintained. Given the conditions under which drives usually operate, because such lens needs to be stay within a range of $\delta$ and such $\delta$ becomes very small if NA gets larger, it is impossible to make the mechanical systems rigid enough to yield the required positioning tolerances.

According to the aforementioned explanation, an intention to use a larger NA for obtaining a smaller d is impractical.

Anyhow, a so-called near field arrangement applied thereto. A proposed method of reducing the focused spot size in an optical disk system involves the use of a solid immersion lens is disclosed in U.S. Pat. No. 5,125,750 by Corle et al.

FIG. 1 is a schematic diagram of an optical recording system employing a solid immersion lens 26, in accordance with the aforementioned '750 patent. In which, an optical system includes a read/write head assembly 17, for reading or writing information on an adjacent recording medium 16, of the type which includes an objective lens 23, for focusing light energy onto a recording medium 16, including a solid immersion lens 26, disposed between the read/write head assembly 17 and the recording medium 16, wherein the solid immersion lens 26, includes a spherical surface facing the read/write head assembly and a flat surface closely spaced from the recording medium 16.

The immersion lens 26, is so placed to reduce the wavelength of light at the surface of the optical disk by a factor of $$\lambda/n_{sil}.$$

Where $n_{sil}$ is the refractive index of the solid immersion lens. The reduced wavelength allows smaller spots of light to be produced at the surface of the disk (optical recording medium).

The size of the spot of light determines the size of a stored bit of information on the optical disk. If $n_{sil}=2$ is used, the spot size of one bit of information is cut in half so that the density of bits is increased by a factor of 4. Thus the simple addition of a solid immersion lens into an optical system can dramatically increase the storage capacity of an optical disk system.

Another advantage of having a smaller spot size is that the optical power density at the surface of the optically sensitive material is higher than in a system without solid immersion lens. A higher power density allows lower power illumination sources to achieve the necessary power densities to activate (or expose) a bit on the disk.

However, this approach has some disadvantages. The first one is the assembly must be mounted on a movable arm so that the optical alignment will keep accurate enough during the movement of the optical head and the disk. This will increase the weight of the movable optical head and so that it becomes very difficult to keep a very narrow gap between the solid immersion lens and the disk. The second disadvantage is the difficulty to mount the solid immersion lens onto the whole optical head because of the air gap between the solid immersion lens and the objective lens.

In order to reduce the weight of an optical head itself, U.S. Pat. No. 5,245,491 (by Horie et al.) discloses an optical fiber type optical head. FIG. 2 is a view of main figure of the '491 patent showing one embodiment of the fiber type of the optical head.

With this invention, an optical fiber type optical head has a stationary portion 120, which condenses a light beam and leads the light beam into an optical fiber 126. One end of the optical fiber is fixed with the stationary portion 120 while the other end of the fiber 126 is fixed to another portion of the optical head, i.e., the movable portion 130.

This approach separates the whole optical system into two portions and makes only one portion onto mounting arm so that the weight of the optical head itself can be reduced.

However, this approach does not solve the problem of spot size so the storage density is still low and the weight is still an issue here because the optics of movable portion 130, including lenses 127 and 129, is still on the movable arm.

SUMMARY OF THE INVENTION

It is therefore a general object of the present invention to provide an optical read/write head for the great data storage and compact size disks.

It is a further object of the invention to provide a read/write head in which a tapered optical fiber is used to decrease spot size and increase the optical recording density and resolution.

It is also a further object of the invention to provide a read/write head in which a light weight optical fiber is used between the optical head and the optics of signal processing so that the optical head is light weighted and also easy, thus reducing the cost.

According to the invention, the optics of a read/write system includes an optical mean, which is stationary, for condensing a light beam and leading the light beam into an optical fiber. A tapered tip is defined on the distal end, which is movable, of the optical fiber for focusing light emerging from the optical fiber into a beam spot on an optical recording medium. A detector for detecting through the optical fiber light reflected back from the recording medium.

The foregoing and other objects of the invention are achieved by a tapered optical fiber which deliver light onto optical disk and collect reflected light from the disk surface.

BRIEF DESCRIPTION OF THE DRAWINGS

The foregoing and other objects of the invention will be more clearly understood from the following description when read in conjunction with the accompanying drawings, in which:

FIG. 6 shows a floating mount for an optical tapered fiber.

DETAILED DESCRIPTION OF THE INVENTION

Figure 1:
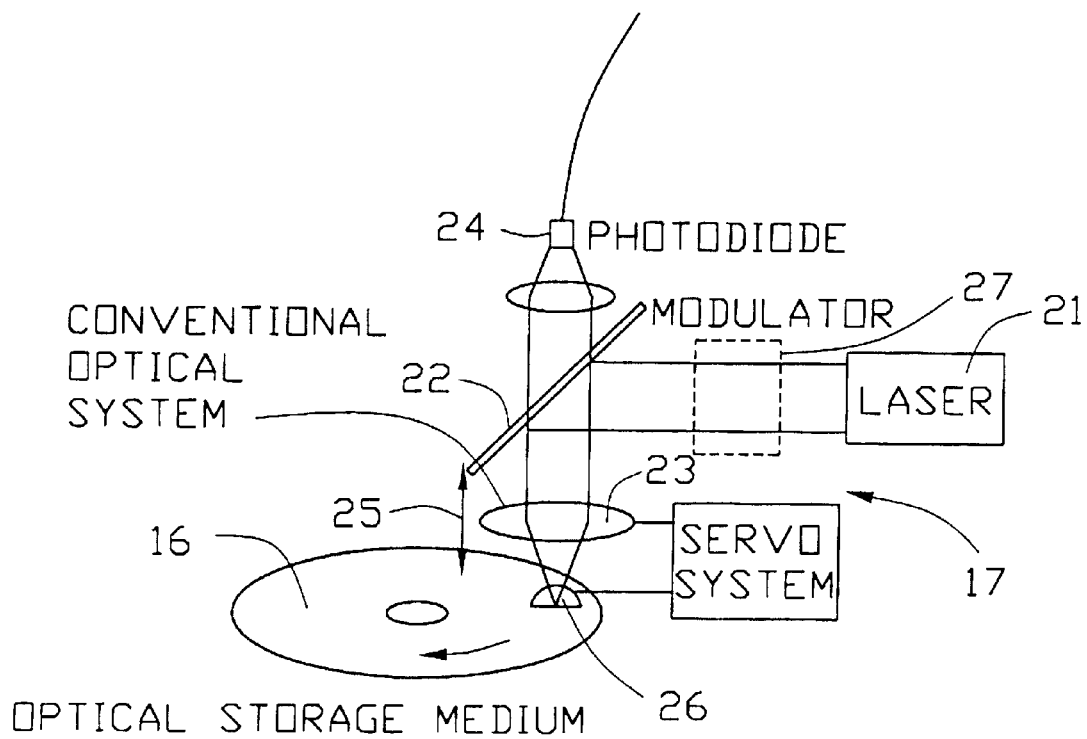
FIG. 1 is a schematic view of an optical system in a read/write head employing solid immersion lens according to the prior art of U.S. Pat. No. 5,125,750.
Figure 2:
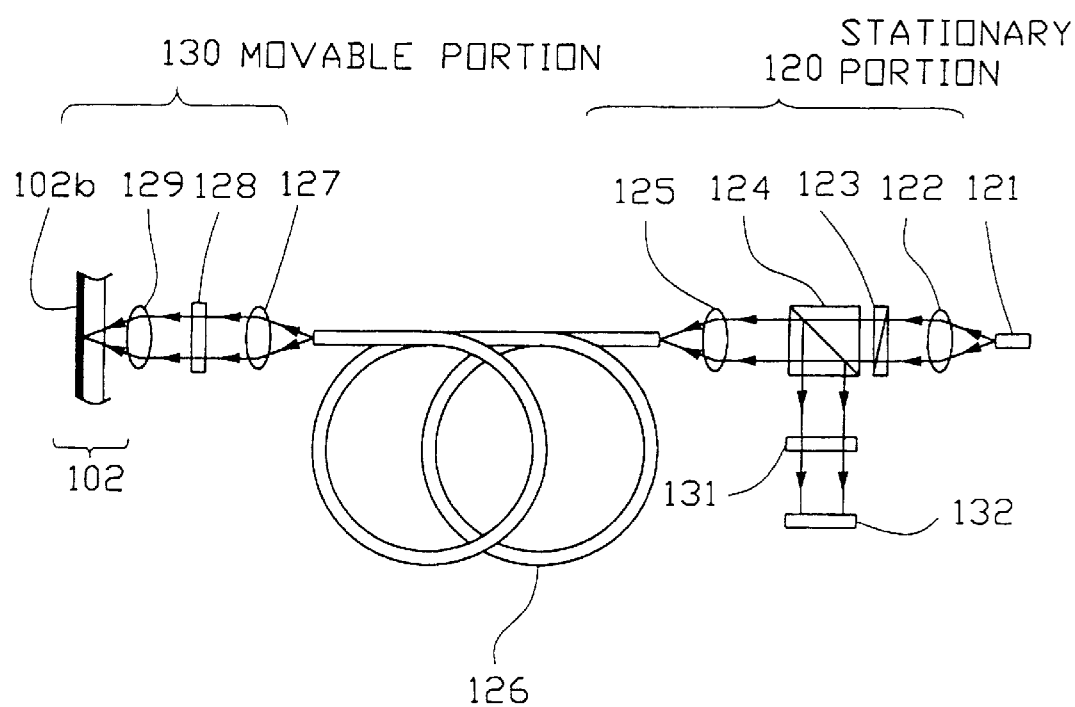
FIG. 2 is a diagram showing the embodiment of an optical system in a read/write head employing an optical fiber according to prior art of U.S. Pat. No. 5,245,491.
Figure 3:
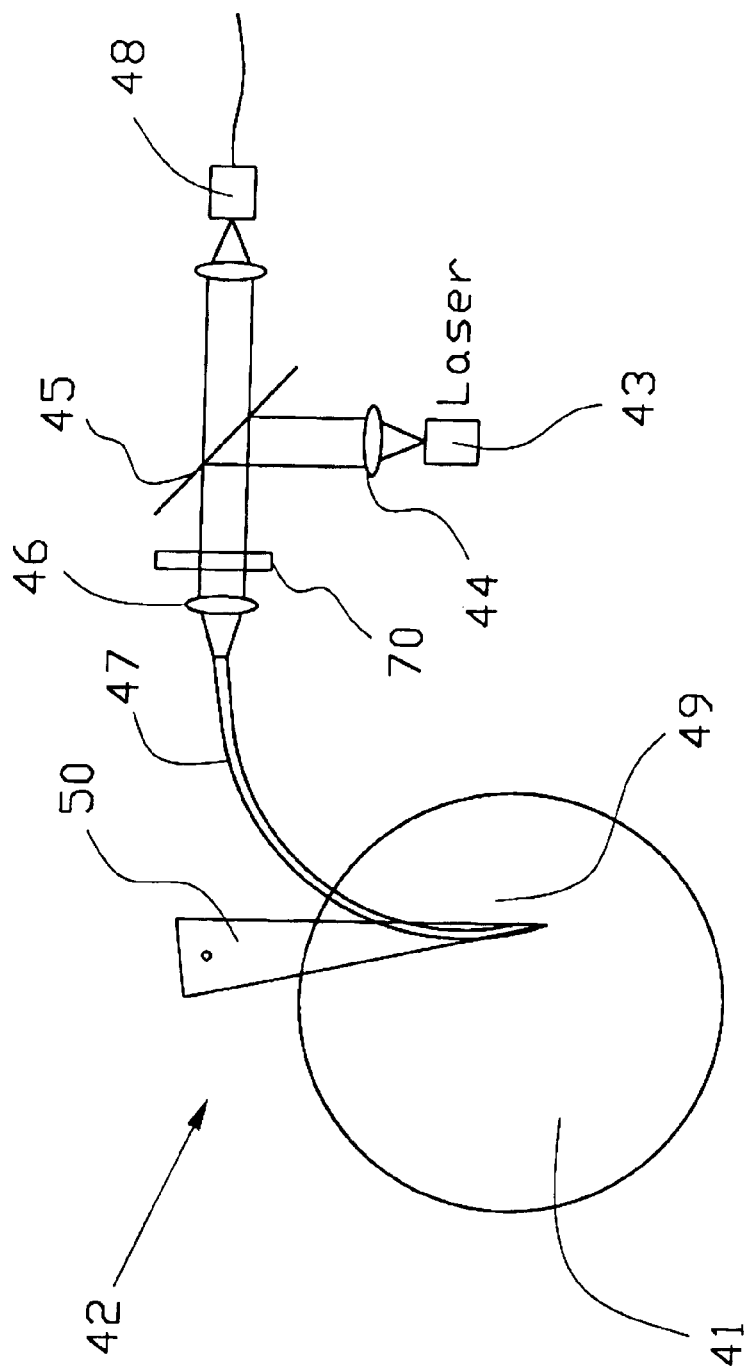
FIG. 3 is a view showing one embodiment of an optical recording system employing a tapered optical fiber in accordance with this invention.

Referring to FIG. 3, there is schematically shown an optical recording system 40. The system 40 employs an optical recording disk 41 which is associated with a read/write head assembly 42. The system 40 includes a recording disk 41 onto which the light from the laser 43 focuses on. The light is reshaped and collimated by lens 44. The light is deflected by beam splitter 45 and focused into optical fiber 47 by an objective lens 46. The reflected light is received by photodiode 48.

In accordance with the present invention, fiber taper 49 is one end of the optical fiber 47 and is mounted on a movable arm 50.

With reference to FIG. 3, the light from a laser or other source is used to illuminate the optical disk through the optical fiber taper.

Figure 4:
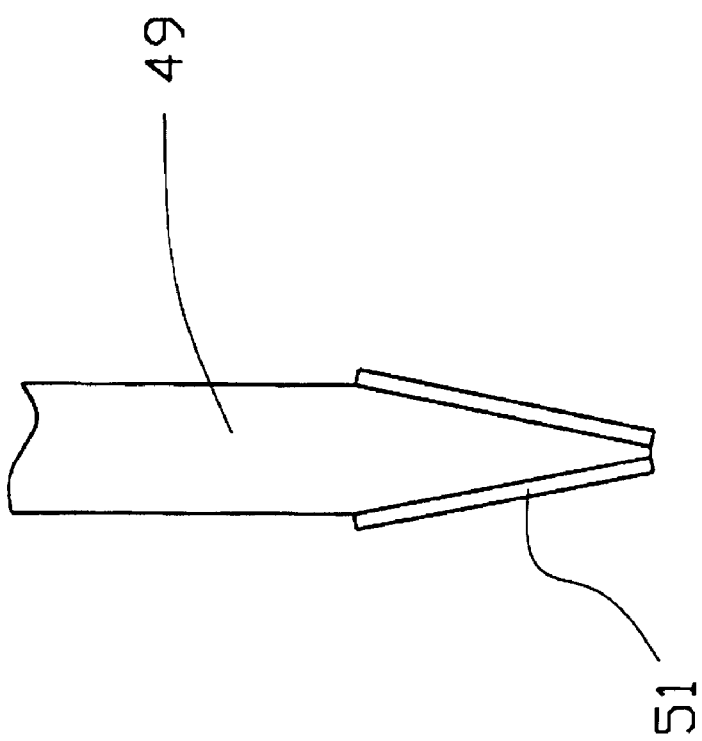
FIG. 4 is a schematic view of the optical taper.

The fiber taper is shown detailed in FIG. 4. The production of a serviceable taper usually requires only the adaptation of commercial pipette pulling instruments to fiber usage followed by simple thermal evaporation of a metal coating 51.

The fiber taper reduces the spot size in fiber (For 630 nm laser, it is about 4 $\mu$m.) to a spot size of about the tip diameter of the taper so the spot size at the surface of optical disk is also reduced, thus allowing more information to be stored.

The propagation of light coming out from fiber taper is guided by electro-magnetics theory. When the distance between fiber tip and active layer of optical disk is less than half of the light wavelength (So the distance from emitting point to collecting point is less than one wavelength.), the light beam is almost collimated with a spot size almost the same as that coming out from the fiber tip. The theory is called near-field optics and is well described in "Near-field optics", by Paesler and Moyer, John Wiley & Sons, Inc., 1996.

One big concern of this structure is the loss of light energy by the taper shape. Another concern is that at the limit of light intensity, the taper can be driven to catastrophic failure by increasing the lost laser power until the metal (usually aluminum) coating is vaporized and/or the structure integrity of the dielectric is destroyed.

Figure 5:
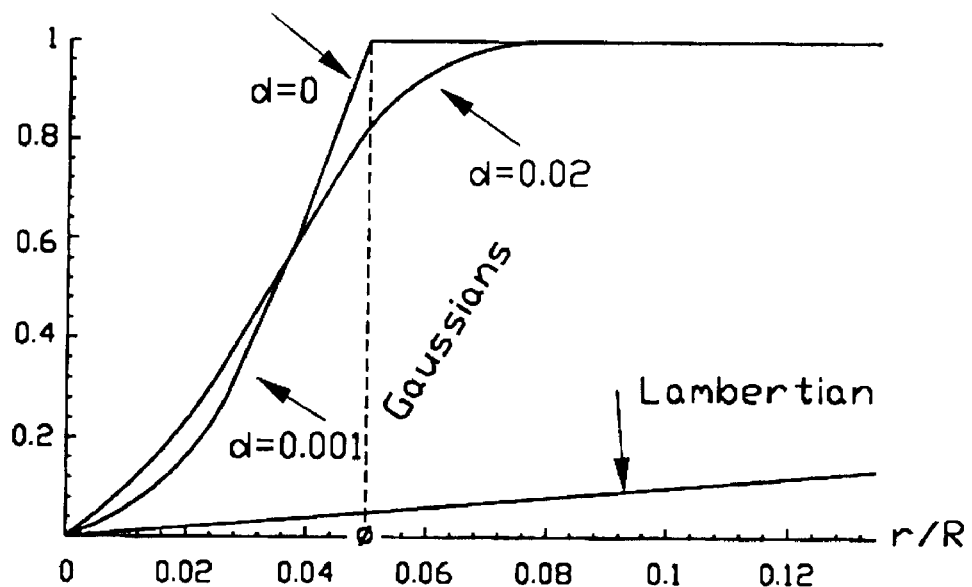
FIG. 5 is a diagram showing the throughput of a conical taper as a function of tip radius.

Fortunately, if the final size of fiber tip is not that small, these two concerns are neglectable. FIG. 5 shows the calculation of throughput of a conical taper as a function of tip radius r compared to regular fiber radius R. With 650 nm laser, the regular single mode optical fiber usually has a diameter around 4 $\mu$m. When we pull the fiber tip into a diameter around 0.4 $\mu$m (So r/R is around 0.1.), the output is still 100% in accordance with the diagram shown in FIG. 5 so that there is no power loss with this size. The size of 0.4 $\mu$m is about the half size of far-field spot size so that the density of bits is increased by a factor of 4.

There are two common read/write techniques which have been popularly used in optical data storage application.

One is called phase change approach. In the high power mode, the intensity of the laser may be modulated to write bits of data on the disk. When the laser is at "on" state, it changes its physical properties of the disk in order to store a bit of information. In the low power mode, the reflected signal may be read by a photodiode to decode the information stored on the disk.

Another one is the magnetic-optic approach. The optical disk contains a magnetic storage medium in which the magnetization is controlled by the incident light to store information and the stored information is read out by sensing the rotation of polarization of reflected light introduced by the magnetized medium.

No matter which approach is used, the optical system needs a polarization unit 70, as shown in FIG. 3. This polarization unit will guide reflected beam through beam splitter 45 so photodetector 48 will receive it and there will no reflection back to laser source 43.

With this structure of the invention, the weight of arm 50 is very light compared with other existing structure. The position of the fiber taper 49 is maintained by a servo system. For different approaches mentioned above, the height of optical head above the optical disk should be kept from several nanometers to several hundreds nanometers to realize the higher definition. One simple method is to fly the optical head above the surface of optical disk similar to the way in which thin film magnetic heads are flown over the surface of magnetic disks. In a properly designed system, the air currents generated by the spinning disk cause the head to float several tens nanometers above the disk surface, therefore keeping the spacing.

One big advantage of this invention is that the relatively larger tolerance on the spacing between the optical head and the optical disk is allowed because the beam out from the tapered fiber tip keeps almost collimated within a range of one wavelength of the light. In other words, the design of servo system will be much easier than focusing approach used by the prior arts where the beam is widely diverging so the servo system must keep the distance between the optical head and the optical disk very precise and exact. In practice, as mentioned in an earlier time, the distance between the fiber tip and the active layer of the disk can be set from 0 to $\lambda/2$ while still keeping the whole system working, i.e., the tolerance being $\lambda/2$ which is almost ten times more than the tolerance of the existing prior arts in which the tolerance is the aforementioned $\delta$.

An example of floating mounting is shown in FIG. 6. The fiber tapered tip 49 is mounted in a mounting member 62 which is connected to the arm So. The mounting member 62 includes a conical opening 63 which receives the tip 49. The epoxy 64, or other fixing tools, such as springs, holds the conical shape fiber tip while allowing it to float.

In conclusion, the advantages of the invention include (1) an inexpensive and easy-to-make manufacturing method; (2) a structure allowing larger tolerance; and (3) a simple, light and compact mechanism thereof, thus the invention being superior to the existing prior high density data storage systems as disclosed in the background portion of this specification.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. An optical system comprising:

a laser for providing light energy;

a lens transmitting said light energy from said laser to a head assembly;

said head assembly including a fiber with a tapered tip at a distal end; and a recording medium to which the tapered tip of the fiber points; wherein said tapered tip is mounted to a mounting member formed on a front end of a moveable arm of said head assembly, and a distance between the tapered tip and the recording medium is one half of a wavelength of a corresponding light providing said light energy.

* * * * *